United States Patent [19]

Blackwell

[11] 4,451,601

[45] May 29, 1984

[54] GLASS-FILLED POLYARYLENE SULFIDE COMPOSITIONS CONTAINING ORGANOSILANES

[75] Inventor: Jennings P. Blackwell, Bartlesville, Okla.

[73] Assignee: Phillips Petroleum Company, Bartlesville, Okla.

[21] Appl. No.: 465,079

[22] Filed: Feb. 9, 1983

Related U.S. Application Data

[63] Continuation of Ser. No. 300,859, Sep. 10, 1981, abandoned.

[51] Int. Cl.$^3$ ................................................ C08K 5/54
[52] U.S. Cl. .................................... 524/263; 524/262; 524/609
[58] Field of Search ............................... 524/262, 263

[56] References Cited

U.S. PATENT DOCUMENTS

| | | | |
|---|---|---|---|
| 3,484,333 | 12/1969 | Vanderbilt | 524/263 |
| 3,864,203 | 2/1975 | Marzocchi | 524/263 |
| 4,244,860 | 1/1981 | Kühnel et al. | 524/263 |
| 4,284,549 | 8/1981 | Salee | 524/262 |
| 4,350,786 | 9/1982 | Blackwell et al. | 524/263 |

FOREIGN PATENT DOCUMENTS 52-52958 4/1977 Japan ................................. 524/262

*Primary Examiner*—Joseph L. Schofer
*Assistant Examiner*—N. Sarofim

[57] ABSTRACT

Properties such as flow rate and hydrolytic stability of glass-filled polyarylene sulfide compositions can be modified by the addition of certain organosilanes.

19 Claims, No Drawings

GLASS-FILLED POLYARYLENE SULFIDE COMPOSITIONS CONTAINING ORGANOSILANES

This is a continuation of application Ser. No. 300,859, filed Sept. 10, 1981, abandoned.

This invention relates to certain organosilane-containing glass-filled polyarylene sulfide compositions. This invention also relates to a method for modifying properties of glass-filled polyarylene sulfide compositions by adding certain organosilanes to the compositions. More particularly this invention relates to methods for increasing and decreasing the flow rate of a glass-filled polyarylene sulfide and for improving the hydrolytic stability of a glass-filled polyarylene sulfide.

The only patent disclosing organosilanes in glass-filled polyarylene sulfide compositions of which I am aware is U.S. Pat. No. 4,176,098 (Needham). The Needham patent teaches that small quantities (0.5 to 5 weight percent of the total composition) of silanes can be added to an arc resistant composition to improve its water resistance and linear coefficient of expansion. The arc resistant composition is produced by incorporating glass and other fillers and a substantial amount of clay or talc into a polyarylene sulfide. Needham states that ". . . it is believed that any silane can be utilized to impart improved water resistance and linear coefficient of expansion to the new arc resistant composition, presently preferred are the alkylsilanes, alkoxysilanes, and polymers thereof." Despite this broad language only a few specific silanes such as γ-glycidoxypropyltrimethoxysilane, methyltrimethoxysilane, and methylmethoxysilane are recited by Needham. The utility of certain organosilanes to increase or decrease the flow rate of glass-filled polyarylene sulfide compositions is neither taught nor suggested.

In a preprint from the American Chemical Society Division of Organic Coatings and Plastics Chemistry 40, 538–41 (1979) the effect of silanes on adhesion of size free glass fibers in thermoplastic (including polyphenylene sulfide) composites is examined. The organosilane compounds of my invention, however, are not disclosed.

I have discovered that certain organosilanes may be used in glass-filled polyarylene sulfide compositions to improve hydrolytic stability and/or to effect a change of flow rate.

Accordingly, it is an object of my invention to provide new and useful compositions.

A further object of my invention is to provide a method for modifying properties of glass-filled polyarylene sulfide compositions.

More particularly it is an object of my invention to provide methods for improving hydrolytic stability and increasing or decreasing flow rates of glass-filled polyarylene sulfide compositions.

These and other objects of my invention will become apparent from the disclosure and claims herein provided.

Any uncured or partially cured polyarylene sulfide whether homopolymer, copolymer, terpolymer, and the like, or a blend of such polymers, can be used in the practice of any aspect of this invention. In this application an uncured or partially cured polymer is a polymer the molecular weight of which can be increased by either lengthening of a molecular chain or by cross-linking or by combination of both by supplying thereto sufficient energy, such as heat. A process which increases the molecular weight of the polymer shall be designated as a curing process. Particularly suited for use in this invention are those polyarylene sulfides having inherent viscosities in chloronaphthalene (0.2 gram polymer in 100 cc chloronaphthalene) at 206° C. (402.8° F.) of at least about 0.08, preferably between about 0.1 and about 0.3, and more preferably between about 0.13 and 0.23. Examples of polymers which can be used in this invention are disclosed in U.S. Pat. No. 3,354,129. Other examples of polyarylene sulfides are poly(4,4'-biphenylene sulfide); poly(2,4-tolylene sulfide); a copolymer from p-dichlorobenzene, 2,4-dichlorotoluene, and sodium sulfide, and blends thereof. Of all of the polyarylene sulfides, polyphenylene sulfide (PPS) polymers are presently preferred for use with the invention.

Generally the amount of organosilane to be used should be in excess of about 0.2 weight percent based upon total composition. The currently preferred range is about 0.2 to about 2 weight percent. The scope of this invention, however, encompasses a much broader range and requires only that an amount sufficient to increase or decrease the flow or to improve the hydrolytic stability of the composition be used.

The amount of glass in the polyarylene sulfide should usually be at least about 10 weight percent based upon total composition. The currently preferred range is about 25 to about 60 weight percent.

In addition to glass, other fillers may be present in the polyarylene sulfide so long as these fillers do not adversely affect the composition.

The organosilanes found to be useful for curing or decreasing the flow rate of a glass-filled polyarylene sulfide include the following:

3-Glycidoxypropyltrimethoxysilane,
3-Mercaptopropyltrimethoxysilane,
1-Benzylchloro-2-trimethoxysilylethane,
beta-(3,4-Epoxycyclohexyl)-ethyltrimethoxysilane,
2-p-Sufoxylazylethyltrimethoxysilane, and
(p-Aminophenyl)trimethoxysilane.

The scope of this aspect of my invention encompasses both uncured and at least partially cured mixtures of a glass-filled polyarylene sulfide and at least one of the above-identified organosilane flow decreasing or curing agents. When cured at a temperature greater than or about equal to its melting point, the resultant composition exhibits a substantial flow retarded characteristic.

My invention also includes a method for curing and reducing the flow rate of glass-filled polyarylene sulfides by adding at least one of the above-identified organosilanes to a glass-filled polyarylene sulfide and curing the same at a temperature greater than or about equal to the melting point of the polyarylene sulfide.

Although all polyarylene sulfides are contemplated to be suitable in the practice of my invention, polyphenylene sulfide is currently preferred. In the case of polyphenylene sulfide the curing temperature should be in excess of about 550° F. The currently preferred curing temperature is about 600° F. but a wide temperature range is contemplated.

Curing may be accomplished by mixing a glass-filled polyarylene sulfide and at least one of the organosilane curing agents in a blender and extruding the mixture at a sufficiently high temperature to effect curing. This is the currently preferred method since it obviates the need for a separate curing step after the molding process.

The organosilanes found to be useful for increasing the flow rate of a glass-filled polyarylene sulfide include the following:

3-N-(Trimethoxysilylpropyl)polyethylenimine,
N-beta-(Aminoethyl)-gamma-aminopropyltrimethoxysilane,
Diethylamino-3-trimethoxysilylpropyldisulfide,
3-(diethylamino)propyltrimethoxysilane and
3-Aminopropyltriethoxysilane.

I have found that by adding one of the above-identified organosilane flow increasing agents to a glass-filled polyarylene sulfide and heating the same at a temperature greater than or about equal to the melting point of the polyarylene sulfide, the resultant composition exhibits an increased flow rate.

The scope of this aspect of my invention includes compositions of polyarylene sulfide and the above organosilanes both prior to and after heating.

Polyphenylene sulfide is currently preferred, but all polyarylene sulfides are contemplated to be suitable. In the case of polyphenylene sulfide the heating temperature should be in excess of about 550° F. The currently preferred heating temperature is about 600° F. but a wide temperature range is contemplated.

This aspect of my invention may be practiced by mixing a glass-filled polyarylene sulfide and at least one of the appropriate organosilanes in a blender and extruding the mixture at a temperature greater than or about equal to the melting point of the polyarylene sulfide.

Operability of the invention has been demonstrated through a series of laboratory experiments. In each run 0.8 weight percent of an organosilane was added to 40 weight percent glass-filled 60 weight percent polyphenylene sulfide. The polyphenylene sulfide used is known under the trademark Ryton PR-06 (Phillips Petroleum Co.) and has a melt flow of 120±20 g/10 min. The mixture was stirred in a Welex blender and extruded at 600° F. through a Davis Standard extruder. After extrusion the blend was dried for 3 hours at 350° F. and then molded in a New Britain mold. The flow rate for each run was determined and appears in Table I.

process. Associated with the other organosilanes was an increase in flow rate. The increased flow rate attributable to this latter group of organosilanes appears to be due to depolymerization.

Table II displays the results when organosilanes, successfully used as curing agents for glass-filled polyphenylene sulfide, are used with non-filled polyphenylene sulfide.

TABLE II

| 0.8 Wt. % Silane Added to Polyphenylene Sulfide | | |
|---|---|---|
| | Flow Rate, g/10 mins. at 600° F. | |
| Organosilane | Without Silane | With Silane |
| 1. 1-Benzylchloro-2-Trimethoxysilylethane | 519 | 476 |
| | 519 | 551 |
| 2. (p-Aminophenyl)trimethoxysilane | 519 | 523 |
| | 519 | 1008 |

The absence of a decrease in flow rate indicates that the organosilanes are not useful as curing agents in non-filled polyphenylene sulfide. The presence of glass in the polyarylene sulfide is thought to be necessary for the successful practice of my invention. It is believed that the flow rate of the composition is decreased by a combination of two reactions: (1) the reaction between the silane portion of the silane molecule and the hydroxyl groups attached to the glass fiber surfaces resulting in a chemical bond; and (2) the reaction between the other end of the silane molecule and the polyarylene sulfide backbone to form another chemical bond. This chemical binding of glass fiber and polyarylene resin is believed to be, at least in part, responsible for the decrease in flow rate. This theory is offered only as a possible explanation and is not intended to further limit or define my invention.

I have also discovered that certain organosilanes when compounded into cured or partially cured glass-filled polyarylene sulfide compositions provide hydrolytic stability to the compositions.

The following examples serve to identify the or-

TABLE I

| 0.8 Wt. % Silane Added to 40 Wt. % Glass-Filled Polyphenylene Sulfide | | |
|---|---|---|
| | Flow Rate, g/10 mins. at 600° F. | |
| Organosilane | Without Silane | With Silane |
| 1. 3-Glycidoxypropyltrimethoxysilane | 23 | 1 |
| 2. 3-Mercaptopropyltrimethoxysilane | 23 | 2 |
| | 35 | 12 |
| 3. 1-Benzylchloro-2-Trimethoxysilylethane | 48 | 0 |
| | 37 | 0.1 |
| 4. beta-(3,4-Epoxycyclohexyl)-ethyltrimethoxysilane | 49 | 1 |
| 5. 2-p-Sufoxylazylethyltrimethoxysilane | 35 | 5 |
| 6. (p-Aminophenyl)trimethoxysilane | 48 | 10 |
| 7. Diethylamino-3-trimethoxysilylpropyl disulfide | 35 | 177 |
| 8. 3-(Diethylamino)propyltrimethoxysilane | 35 | 136 |
| 9. N—beta-(Aminoethyl)-gamma-aminopropyltrimethoxylsilane | 35 | 108 |
| | 58 | 226 |
| 10. 3-Ureidopropyltriethoxysilane | 58 | 134 |
| 11. 3-Aminopropyltriethoxysilane | 58 | 139 |
| 12. Vinyltriethoxysilane | 58 | 117 |
| | 64 | 52 |
| 13. 3-N—(Trimethoxysilylpropyl)polyethylenimine | 47 | 336 |

As evidenced by a corresponding decrease in flow rate the first six organosilanes facilitated curing of the glass-filled polyphenylene sulfide during the extruding ganosilanes which are useful for this aspect of my invention. The examples further serve to illustrate the operability of my invention.

EXAMPLE I

This example describes the procedure used to prepare the samples and the subsequent testing. The method of preparation was generally as follows: 16 grams of a particular silane was added dropwise to 800 grams of 0.125 inch milled glass fibers (Owen-Corning) in a Welex Blender after which the contents were placed in a fiber drum and tumbled along with 1200 grams of polyphenylene sulfide known under the trademark Ryton PR-06 (Phillips Petroleum Co.) having a melt flow of 120±20 g/10 min. The mixture was extruded through a Davis Standard extruder at 600° F. (316° C.), dried in a 350° F. (177° C.) oven for 3 hours and molded using a New Britain molding machine (barrel 600° F., mold 275° F.) into bar specimens, 8 inches×1 inch×0.125 inch. The bars (generally 3 per set) were immersed in water in a pressure cooker at 120° C. and 15 psig for 150 hrs., cooled, dried in an oven for a few hours at 110° C., conditioned overnight at room temperature and evaluated. Tensile strength was determined in accordance with test method ASTM D 882-56T. These results, shown in the following tables, provide a good indication of hydrolytic stability. Percent loss of tensile strength values below about 15% are preferred but any value below that of the control (i.e. no silane) is acceptable.

TABLE III

Effect of Various Organosilanes on the Hydrolytic Stability of PPS-Glass Compositions

| No. | Organosilane Tradename[a] | Chemical Identity | Tensile Strength, Mpa Initial | % Loss After 150 hrs/120C/15 psi |
|---|---|---|---|---|
| 1 | — | Control - no silane | 63.0 | 29.4 |
| 2 | A-1120 | N—beta-(Aminoethyl)-gamma-aminopropyl trimethyoxysilane | 67.5 | 22.1 |
| 3 | A-1160 | 3-Ureidopropyltrimethoxysilane | 62.7 | 11.4 |
| 4 | A-1100 | gamma-Aminopropyltriethoxysilane | 71.5 | 10.8 |
| 5 | A-151 | Vinyltriethoxysilane | 71.7 | 7.0 |

[a] A series from Union Carbide
Z series from Dow Corning
T, P series from Petrarch Systems, Inc.
Silar from DeGussa

TABLE IV

Effect of Various Organosilanes on the Hydrolytic Stability of PPS-Glass Compositions

| No. | Organosilane Tradename[a] | Chemical Identity | Tensile Strength, Mpa Initial | % Loss After 150 hrs/120C/15 psi |
|---|---|---|---|---|
| 6 | — | Control - no silane | 44.9 | 40.5 |
| 7 | Z6032 | N—{2-[3-(Trimethoxysilyl)propylamino]ethyl}- | 58.5 | 11.3 |
| 8 | T2902 | 2-(Benzylchloro)ethyltrimethoxysilane | 52.2 | 6.9 |
| 9 | Z6070 | Methyltrimethoxysilane | 49.7 | 29.0 |

[a] A series from Union Carbide
Z series from Dow Corning
T, P series from Petrarch Systems, Inc.
Silar from DeGussa

TABLE V

Effect of Various Organosilanes on the Hydrolytic Stability of PPS-Glass Compositions

| No. | Organosilane Tradename[a] | Chemical Identity | Tensile Strength, Mpa Initial | % Loss After 150 hrs/120C/15 psi |
|---|---|---|---|---|
| 10 | — | Control - no silane | 136.3 | 26.9 |
| 11 | A-1893 | beta-Mercaptoethyltrimethoxysilane | 88.1 | 28.9 |
| 12 | Z-6040 | gamma-Glycidoxypropyltrimethoxysilane | 100.3 | 31.7 |
| 13 | A-189 | 3-Mercaptopropyltrimethoxysilane | 86.9 | 4.9 |

[a] A series from Union Carbide
Z series from Dow Corning
T, P series from Petrarch Systems, Inc.
Silar from DeGussa

TABLE VI

Effect of Various Organosilanes on the Hydrolytic Stability of PPS-Glass Compositions

| No. | Organosilane Tradename[a] | Chemical Identity | Tensile Strength, Mpa Initial | % Loss After 150 hrs/120C/15 psi |
|---|---|---|---|---|
| 14 | — | Control - no silane | 65.5 | 25.8 |
| 15 | T2905 | 2-(Trimethoxysilyl)ethylphenylsulfonyl-azide | 86.4 | 41.9 |
| 16 | A-189 | 3-Mercaptopropyltrimethoxysilane | 75.3 | 25.5 |

TABLE VI-continued

Effect of Various Organosilanes on the Hydrolytic Stability of PPS-Glass Compositions

| No. | Organosilane Tradename[a] | Chemical Identity | Tensile Strength, Mpa | |
|---|---|---|---|---|
| | | | Initial | % Loss After 150 hrs/120C/15 psi |
| 17 | Silar 1104 | 3-(Diethylamino)propyltrimethoxysilane | 72.5 | 12.7 |
| 18 | Si-69 | Bis(3-triethoxysilylpropyl)tetrasulfide | 62.4 | 10.7 |
| 19 | A-1120 | N—beta(Aminoethyl)-gamma-aminopropyltrimethoxysilane | 64.7 | 9.0 |
| 20 | — | Trimethylsilylpropylazide | 76.6 | 8.1 |
| 21 | Silar 1249 | n-Propyltriethoxysilane | 57.4 | 5.9 |
| 22 | — | N,N'—Diethyltrimethoxysilylpropylthiosulfenamide | 62.4 | 3.4 |

[a] A series from Union Carbide
Z series from Dow Corning
T, P series from Petrarch Systems, Inc.
Silar from DeGussa

TABLE VII

Effect of Various Organosilanes on the Hydrolytic Stability of PPS-Glass Compositions

| No. | Organosilane Tradename[a] | Chemical Identity | Tensile Strength, Mpa | |
|---|---|---|---|---|
| | | | Initial | % Loss After 150 hrs/120C/15 psi |
| 23 | — | Control - no silane | 66.6 | 37.4 |
| 24 | P0156 | N—Phenylaminopropyltrimethoxysilane | 66.5 | 59.2 |
| 25 | P09830 | Octyltrichlorosilane | 48.5 | 33.2 |
| 26 | PS076 | 3-N—(Trimethoxysilylpropyl)poly(ethylenimine) | 60.7 | 24.9 |
| 27 | T4250 | Tris(trimethoxysiloxy)phenylsilane | 60.0 | 23.8 |
| 28 | A-172 | Vinyl tris(2-methoxyethoxy)silane | 77.0 | 20.9 |
| 29 | P0330 | Phenyltrimethoxysilane | 59.7 | 17.3 |
| 30 | Z6062 | 3-Mercaptopropyltrimethoxysilane | 73.8 | 4.5 |
| 31 | P09775 | Octadecyltriethoxysilane | 39.1 | 1.8 |

[a] A series from Union Carbide
Z series from Dow Corning
T, P series from Petarach Systems, Inc.
Silar from DeGussa

SUMMARY OF TABLES III, IV, V, VI, and VII

For the convenience of comparison, the data in the preceding tables were normalized by averaging the five control runs from each table and proportionating each individual silane-containing composition value, in each table, relative to the control in each table and relative to the average control value. The values listed in Table VIII are shown in descending value. Organosilanes associated with a normalized percent loss less than that of the control (i.e. 32.0) are the hydrolytic stabilizing agents of my invention.

TABLE VIII

Summary of Tables III, IV, V, VI and VII

| Reference | | | Normalized % Loss in Tensile Strength |
|---|---|---|---|
| No. | Table | Organosilane | After 150 hrs/120C/15 psi |
| 31 | VII | Octadecyltriethoxysilane | 1.5 |
| 30 (13, 16) | VII (V, VI) | 3-Mercaptopropyltrimethoxysilane | 3.8 (5.8, 31.6) |
| 22 | VI | N,N'—Diethyltrimethoxysilylpropylthiosulfenamide | 4.2 |
| 8 | IV | 2-(Benzylchloro)ethyltrimethoxysilane | 5.5 |
| 7 | IV | N-{2-[3-(Trimethoxysilyl)propylamino]ethyl}-p-vinylbenzylammonium chloride | 8.9 |
| 21 | VI | n-Propyltrimethoxysilane | 7.3 |
| 5 | III | Vinyltriethoxysilane | 7.6 |
| 20 | VI | Trimethylsilylpropylazide | 10.0 |
| 19 (2) | VI (III) | N—beta-(Aminoethyl)-gamma-aminopropyltrimethoxysilane | 11.6 (24) |
| 4 | III | gamma-Aminopropyltriethyoxysilane | 11.7 |
| 3 | III | 3-Ureidopropyltrimethoxysilane | 12.4 |
| 18 | VI | Bis(3-triethoxysilylpropyl)tetrasulfide | 13.2 |
| 29 | VII | Phenyltrimethoxysilane | 14.8 |
| 17 | VI | 3-(Diethylamino)propyltrimethoxysilane | 15.7 |
| 28 | VII | Vinyl tris(2-methoxyethoxy)silane | 17.8 |
| 27 | VII | Tris(trimethoxysiloxy)phenylsilane | 20.4 |
| 26 | VII | 3-N—(Trimethoxysilylpropyl)poly(ethylenimine) | 21.3 |
| 9 | IV | Methyltrimethoxysilane | 22.9 |
| 25 | VII | Octyltrichlorosilane | 28.4 |
| | | ------Control - No Silane------ | 32.0 |
| 11 | V | beta-Mercaptoethyltrimethoxysilane | 34.3 |

TABLE VIII-continued

Summary of Tables III, IV, V, VI and VII

| Reference | | | Normalized |
|---|---|---|---|
| No. | Table | Organosilane | % Loss in Tensile Strength After 150 hrs/120C/15 psi |
| 12 | V | gamma-Glycidoxypropyltrimethoxysilane | 37.7 |
| 15 | VI | 2-(Trimethoxysilyl)ethylphenylsulfonylazide | 51.9 |

EXAMPLE II

This example illustrates the use of mixed organosilanes in glass-filled polyphenylene sulfide compositions. The procedure described in Example I was repeated with the exception that a mixture of silanes was used at the same total organosilane concentration. These results, listed in Table IX, suggest mixtures of organosilanes can be used but with no particular advantage from a tensile strength standpoint. The values shown are normalized in the manner previously described herein.

TABLE IX

Effect of Mixtures of Organosilanes in PPS Compositions

| Reference | | Organosilane Mixture | Normalized % Loss in Tensile Strength After |
|---|---|---|---|
| No. | Table | (Equal Wts of Each) | 150 hrs/120C/15 psi |
| 4 | III | A-1100 | 11.7 |
| 30 | VII | A-Z6062 | 3.8 |
| 5 | III | A-151 | 7.6 |
| — | — | A-1100/Z6062 | 16.0 |
| — | — | A-151/Z6062 | 13.6 |
| — | — | A-1100/Z6062/A-151 | 11.9 |

EXAMPLE III

This example demonstrates that organosilanes can be useful in glass-filled polyarylene sulfide compositions containing other ingredients such as fillers, pigments, etc. The procedure described in Example I was again repeated but with a mineral filled composition as shown below in Table X. The organosilane was added to the talc in a Welex blender before further compounding. The data listed suggest that adding the organosilane to the talc before compounding with the other ingredients, particularly glass, may be beneficial.

TABLE X

Effect of Organosilanes in Mineral Filled PPS-Glass Compositions

| Composition | Wt. % | Grams | Ingredient |
|---|---|---|---|
| | 34.3 | 682 | PPS |
| | 34.3 | 682 | Glass Unsized Fibers, 0.125 inch |
| | 29.6 | 589 | Talc |
| | .3 | 5 | TR-885 (Polyethylene lubricant) |
| | 1.0 | 20 | Acrawax (N,N'—Ethylene bis stearamide, corrosion inhibitor) |
| | .5 | 9 | Pigment |
| | — | — | Organosilane |

| | Organosilane | | Tensile Strength, MPa | |
|---|---|---|---|---|
| No. | Grams | Chemical Identity | Initial | % Loss After 150 Hrs/120C/15 psi |
| 1 | — | Control - No silane | 62.0 | 48.7 |
| 2 | 13.2 | Z6032, N—{2-[3-(Trimethoxysilyl)propyl-amino]ethyl}-p-vinylbenzylammonium chloride | 50.9 | 0 |
| 3 | 5.3 | A-189, 3-Mercaptopropyltrimethoxy-silane | 53.1 | 6.4 |
| 4 | 9.0 | A-189, 3-Mercaptopropyltrimethoxy-silane | 52.0 | 9.4 |

The examples have been provided merely to illustrate the practice of my invention and should not be read so as to limit the scope of my invention or the appended claims in any way.

Reasonable variation and modification, not departing from the essence and spirit of my invention, are contemplated to be within the scope of patent protection desired and sought.

I claim:

1. A composition comprising: glass-filled polyarylene sulfide and at least one organosilane in an amount sufficient to decrease the flow rate of said polyarylene sulfide upon heating of the composition to a temperature at least about the melting point of said polyarylene sulfide; wherein said at least one organosilane is selected from the group consisting of
1-Benzylchloro-2-trimethoxysilylethane,
2-p-Sulfoxylazylethyltrimethoxysilane, and
(p-Aminophenyl)trimethoxysilane.

2. A composition in accordance with claim 1 wherein said organosilane is 1-Benzylchloro-2-trimethoxysilylethane and said polyarylene sulfide is polyphenylene sulfide.

3. A composition in accordance with claim 1 wherein said organosilane is 2-p-Sulfoxylazylethyltrimethoxysilane and said polyarylene sulfide is polyphenylene sulfide.

4. A composition in accordance with claim 1 wherein said organosilane is (p-Aminophenyl)trimethoxysilane and said polyarylene sulfide is polyphenylene sulfide.

5. A composition according to claim 1 wherein the amount of said organosilane is about 0.2 to about 2 weight percent based upon total composition.

6. A method for decreasing the flow rate of a glass-filled polyarylene sulfide, said method comprising: (a) combining glass, polyarylene sulfide and at least one organosilane selected from the group consisting of 1-Benzylchloro-2-trimethoxysilylethane,
2-p-Sulfoxylazylethyltrimethoxysilane, and
(p-Aminophenyl)trimethoxysilane
to produce a mixture; and (b) subjecting said mixture to a temperature of at least about the melting point of said polyarylene sulfide for a time sufficient to effect at least a partial cure of said mixture.

7. A method in accordance with claim 6 wherein said polyarylene sulfide is polyphenylene sulfide.

8. A method in accordance with claim 7 wherein said mixture is extruded at a temperature of at least about 550° F.

9. A method in accordance with claim 7 wherein the weight percentage, based upon total composition, of said at least one organosilane is about 0.2 to about 2.

10. A method in accordance with claim 7 wherein said organosilane is 1-Benzylchloro-2-trimethoxysilylethane.

11. A method in accordance with claim 7 wherein said organosilane is 2-p-Sulfoxylazylethyltrimethoxysilane.

12. A method in accordance with claim 7 wherein said organosilane is (p-Aminophenyl)trimethoxysilane.

13. A composition produced by the method of claim 6.

14. A composition produced by the method of claim 7.

15. A composition produced by the method of claim 8.

16. A composition produced by the method of claim 9.

17. A composition produced by the method of claim 10.

18. A composition produced by the method of claim 11.

19. A composition produced by the method of claim 12.

* * * * *